(12) United States Patent
Anderson et al.

(10) Patent No.: US 8,706,362 B2
(45) Date of Patent: Apr. 22, 2014

(54) MOBILE BIOLOGICAL MATERIAL ENERGY CONVERSION

(75) Inventors: Noel Wayne Anderson, Fargo, ND (US); Stephen Michael Faivre, Sycamore, IL (US)

(73) Assignee: Deere & Company, Moline, IL (US)

( * ) Notice: Subject to any disclaimer, the term of this patent is extended or adjusted under 35 U.S.C. 154(b) by 811 days.

(21) Appl. No.: 12/910,306

(22) Filed: Oct. 22, 2010

(65) Prior Publication Data

US 2012/0101921 A1    Apr. 26, 2012

(51) Int. Cl.
*G06F 7/70* (2006.01)

(52) U.S. Cl.
USPC ..................... 701/50; 340/539.26

(58) Field of Classification Search
USPC ............ 60/39.01, 780, 781; 340/500, 340/539.1–539.26, 870.16; 701/50
See application file for complete search history.

(56) References Cited

U.S. PATENT DOCUMENTS

| | | | |
|---|---|---|---|
| 4,868,752 A * | 9/1989 | Fujii et al. | 701/28 |
| 6,156,561 A | 12/2000 | Kodo et al. | |
| 7,721,515 B2 * | 5/2010 | Pollklas et al. | 56/10.2 J |
| 7,787,997 B2 | 8/2010 | Richards et al. | |
| 8,063,774 B2 * | 11/2011 | Anderson | 340/539.26 |
| 8,195,358 B2 * | 6/2012 | Anderson | 701/30.3 |
| 2002/0034817 A1 | 3/2002 | Henry et al. | |
| 2007/0012045 A1 * | 1/2007 | Chandran et al. | 60/781 |

OTHER PUBLICATIONS

"Does the future hold an algae-powered Bimmer?", R&D magazine, Apr. 2, 2008, pp. 1-2.

"Algae could be a fuel of the future", retrieved Aug. 9, 2010, pp. 1-4 www.gs-cleantech.com/product_des.php?mode=3.
"Biogas plants: fermenting containers", retrieved Aug. 13, 2010 pp. 1-2, Biogasanlagen.
"Advanced Powertrain Research Facility", retrieved Aug. 9, 2010, Argonne National Laboratory Transportation Technology R&D Center, pp. 1-3.
DORAN, "Maximising the returns from growing biomass", Before the Wells Run Dry, pp. 1-7, Green Books, retrieved Aug. 9, 2010.
"Biogas Plants", Biogasanlagen von Analagen, 1 page, retrieved Aug. 9, 2010 http://www.biogas-edelstahl.de.
Biofuels Technology—How Phytoplankton might Provide a Solution for our Energy Dilemma, Aug. 6, 2010, "Mean Green Biofuels", pp. 1-8 http://www.meangreenbiofuels.com.
"Algae system transforms greenhouse emissions into green fuel", The MIT Energy Research Council, pp. 1-3, retrieved Aug. 9, 2010 web.mit.edu/erc/spotlights/alg-all.html.
"Basic Energy Sciences", U.S. Department of Energy, pp. 1-2, retrieved Aug. 9, 2010 www.sc.doe./gov/.../BES.htm.
"World's First Sample of Bio-Diesel From Algae", May 11, 2006, Aquaflow Bionomic Corporation, pp. 1-2.
"Veridium Technology Converts Exhaust Carbon Dioxide from Fermentation Stage of Ethanol Facilities into New Ethanol and Biodiesel", Red Orbit News, pp. 1-3 retrieved Aug. 9, 2010 redorbit.com/modules/news/tools.php.

* cited by examiner

*Primary Examiner* — Phutthiwat Wongwian
(74) *Attorney, Agent, or Firm* — Yee & Associates, P.C.

(57) ABSTRACT

The different illustrative embodiments provide a method for processing biological material. Biological material is monitored for in a field. The biological material is retrieved from the field to form retrieved biological material in response to detecting the biological material in the field. A conversion system converts the retrieved biological material into energy. A portion of the energy is directed to a remote location. The conversion system moves in the field during at least one of the monitoring, the retrieving, and the converting.

11 Claims, 10 Drawing Sheets

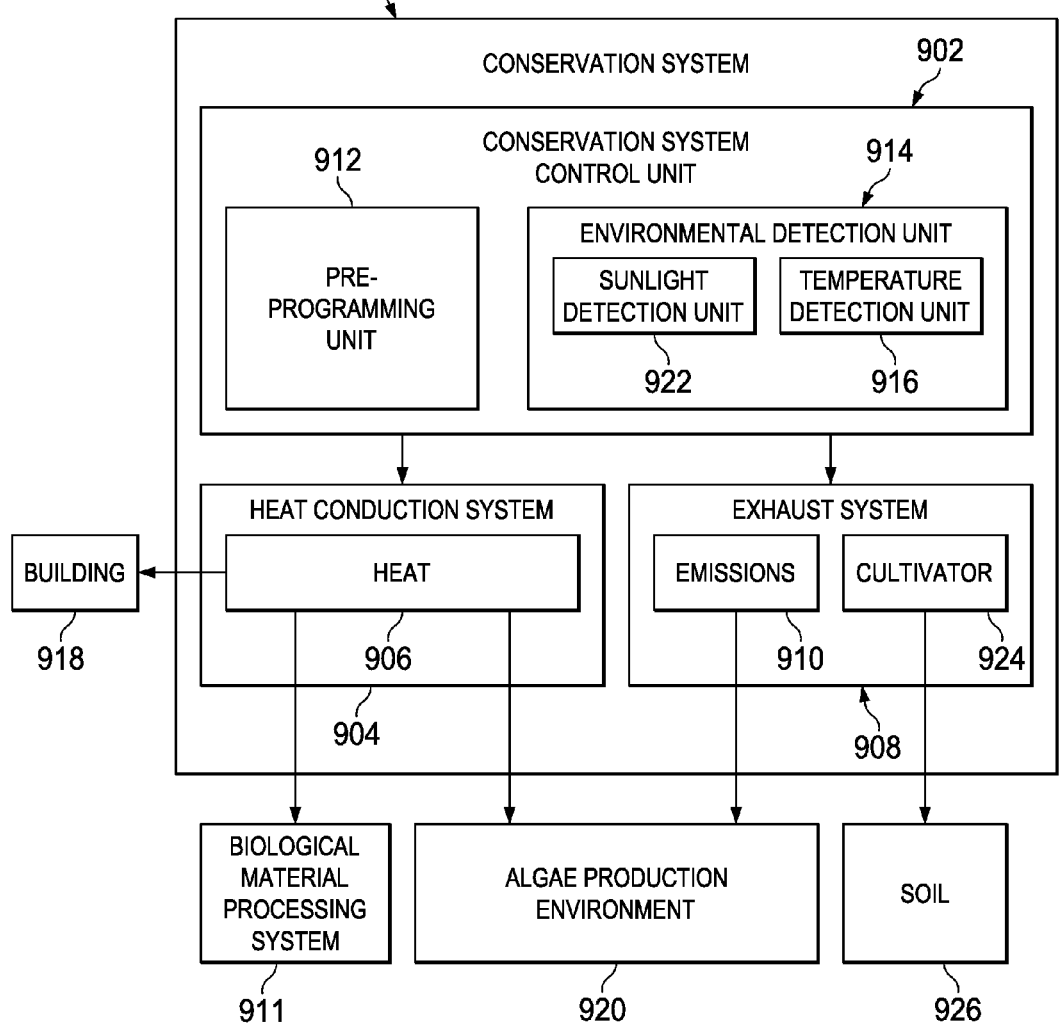

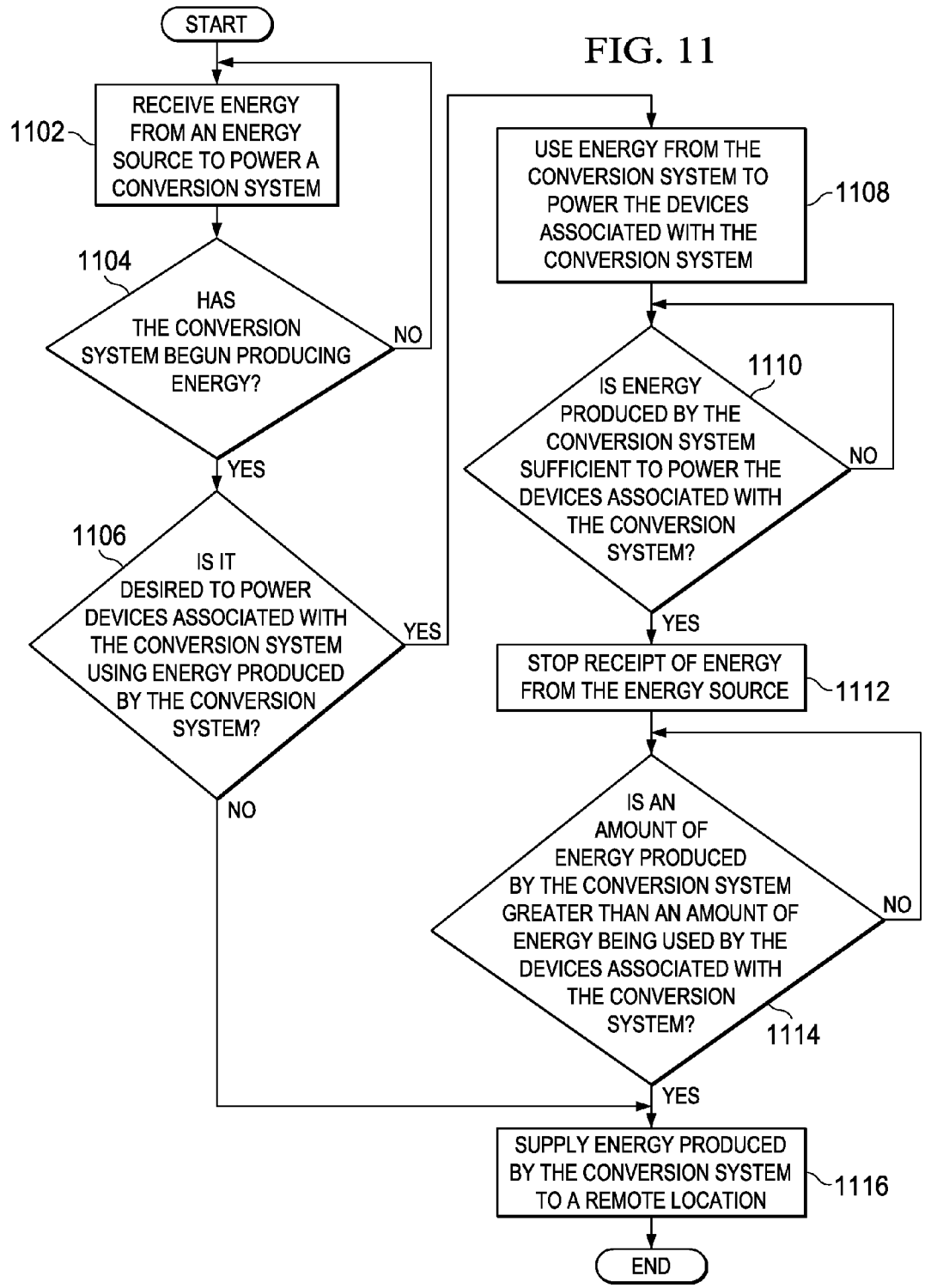

MOBILE BIOLOGICAL MATERIAL ENERGY CONVERSION

FIELD OF THE INVENTION

The present invention relates generally to systems and methods for energy generation and more particularly to systems and methods for conversion of biological material into energy. Still more specifically, the present invention relates to systems and methods for conversion of biological material into energy using mobile devices.

BACKGROUND OF THE INVENTION

Fossil fuels have long been used as a resource to produce energy. Fossil fuels refer to sources of energy that are made from carbon and formed in the earth over many years. Fossil fuels are generally considered non-renewable resources. Non-renewable resources are resources that depleted much faster than new reserves of fossil fuels can be formed. Recently, the demand for energy has increased. With the supply of non-renewable resources decreasing, the price of energy has increased.

As a result, emphasis has been placed on developing renewable resources to produce energy. Renewable resources are resources that can be replenished in the earth naturally. Renewable resources are resources that can be replenished at a rate that can sustain the rate of consumption of the resource. Renewable resources may include sunlight, wind, water, and plants.

Accordingly, it would be advantageous to have a method and apparatus, which takes into account one or more of the issues discussed above as well as possibly other issues.

SUMMARY

The different illustrative embodiments provide a method for processing biological material. Biological material is monitored for in a field. The biological material is retrieved from the field to form retrieved biological material in response to detecting the biological material in the field. The retrieved biological material is converted into energy by a conversion system. A portion of the energy is directed to a remote location. The conversion system moves in the field during at least one of the monitoring, the retrieving, and the converting In another illustrative embodiment, an apparatus comprises a platform, a sensing system, a retrieval mechanism, a movement system, an energy converter, and an energy transfer system. The sensing system is associated with the platform and configured to monitor for biological material in a field. The retrieval mechanism is associated with the platform and configured to retrieve the biological material from the field to form retrieved biological material in response to the sensing system detecting the biological material remaining in the field that has been harvested. The movement system is associated with the platform and configured to move the platform through the field. The energy converter is configured convert the retrieved biological material into energy. The energy transfer system is configured to direct a portion of the energy to a remote location.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

FIG. 9 is a block diagram of a conservation system in accordance with an illustrative embodiment;

FIG. 11 is a flowchart illustrating a process for directing the flow of energy in a conversion system in accordance with an illustrative embodiment.

DETAILED DESCRIPTION

Figure 1:
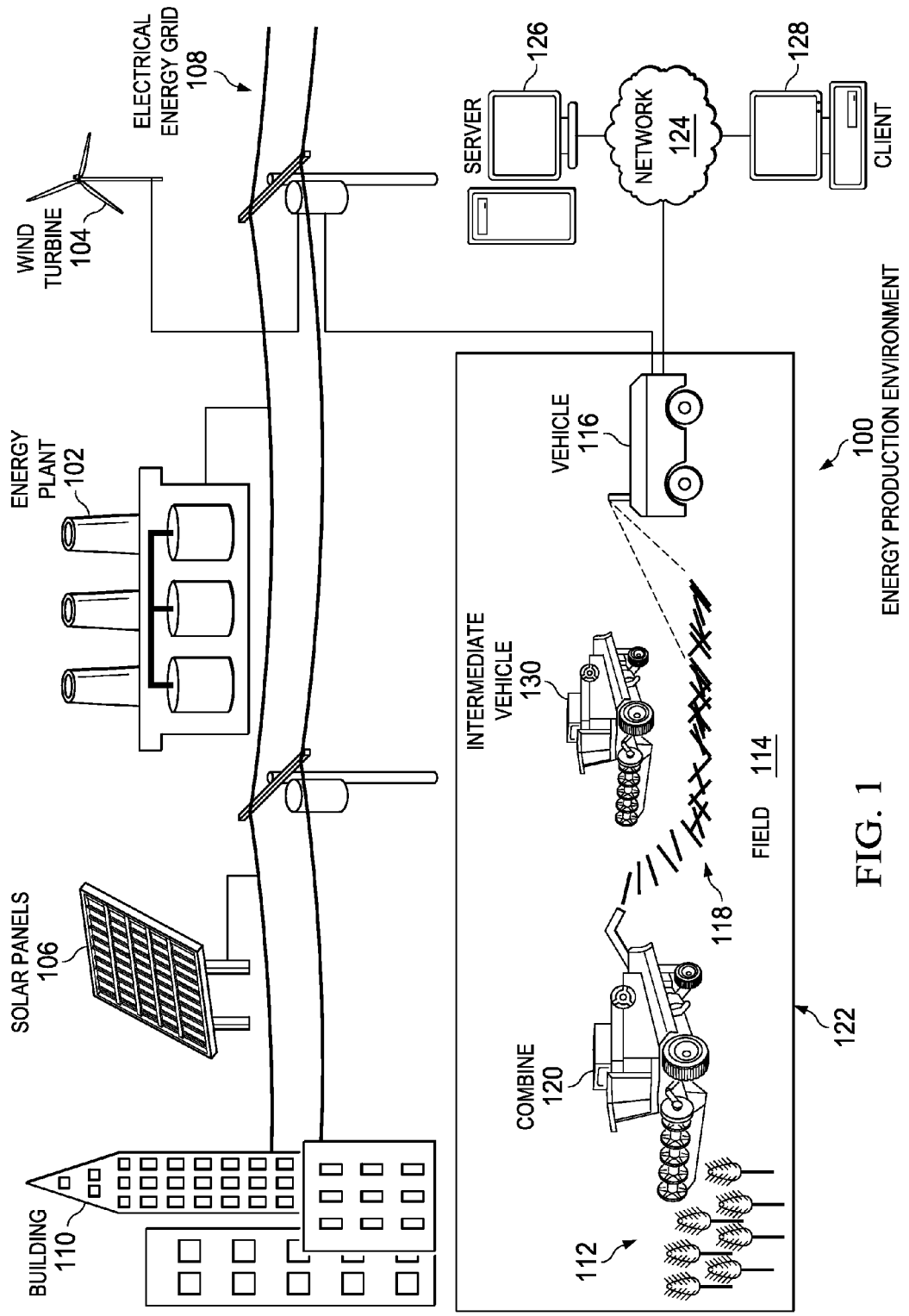
FIG. 1 is an illustration of an energy production environment in accordance with an illustrative embodiment.

With reference to the figures and in particular with reference to FIG. 1, an illustration of an energy production environment is depicted in which an illustrative embodiment may be implemented. Energy production environment 100 includes energy plant 102, wind turbine 104, and solar panels 106. Energy production environment 100 further includes electrical energy grid 108 as well as building 110.

Energy plant 102, wind turbine 104, and solar panels 106 may be examples of systems that produce energy. Energy plant 102, wind turbine 104, and solar panels 106 may use renewable resources to produce energy in energy production environment 100. For example, energy plant 102 may receive plants 112 to produce energy. Plants 112 may be grown in field 114. Plants 112 are examples of renewable resources because plants 112 may be grown again after they are harvested. Energy plant 102 may process plants 112 to produce energy stored in a liquid form, such as ethanol or diesel, for example. Alternatively, energy plant 102 may burn plants 112 to produce energy. For example, heat produced by burning plants 112 may be used to heat water to generate steam. The steam generated may then be used to rotate a wire in the presence of a magnetic field to generate electrical energy.

As depicted, energy production environment 100 includes electrical energy grid 108 and building 110. Electrical energy grid 108 includes wires used to transport electrical energy. The electrical energy may be transported from sources such as, energy plant 102, wind turbine 104, and solar panels 106. The electrical energy may be transported to consumers of the electrical energy, such as building 110, for example.

Energy production environment 100 also includes vehicle 116. Vehicle 116 may also be capable of producing energy using renewable resources. Vehicle 116 may move within field 114 and collect biological material 118. Vehicle 116 may be configured to convert biological material 118 into energy.

As used herein, biological material is material from any living or recently living organisms. Biological material may also be organic materials. Biological material may be referred to as biomass. Biological material 118 can include plant materials from plants such as, for example, without limitation, grass, corn, wheat, sugarcane, sorghum, soybean, cotton, potatoes, and/or algae. In one embodiment, biological material 118 may be unharvested material growing in a field. In another embodiment, biological material 118 may be material remaining in field 114 after field 114 has been harvested. For example, field 114 may be harvested by combine 120. Combine 120 may collect certain portions of plants 112. Combine 120 may also discard other portions of plants 112 in field 114 to form biological material 118. Thus, biological material 118 may also include, for example, without limitation, any leaves, stems, stalks, roots, chaff, stover, and/or straw from plants 112.

Vehicle 116 may be any type of vehicle including, without limitation, a combine, a tractor, a semi-autonomous vehicle, a fully autonomous vehicle, a mobile robotic machine, a service robot, a field robot, a robotic mower, and/or any other autonomous vehicle. As used herein, a vehicle may be considered to be "autonomous" by being capable of operating without human intervention, aid, and/or supervision. Thus, a vehicle may be "autonomous" in that the vehicle is capable of performing a task without human intervention, aid, and/or supervision. Also as used herein, a vehicle may be considered to be "semi-autonomous" by being capable of performing only a portion of tasks without human intervention, aid, and/or supervision.

Energy production environment 100 further includes network data processing system 122. Network data processing system 122 is a network of computers in which embodiments may be implemented. Network data processing system 122 contains network 124, which is the medium used to provide communication links between various devices and computers connected together within network data processing system 122. Network 124 may include connections, such as wire, wireless communication links, or fiber optic cables.

In the depicted example, server 126 connects to network 124. In addition, client 128 connects to network 124. Client 128 may be, for example, one or more personal computers or network computers. In the depicted example, server 126 provides data, such as boot files, operating system images, and applications to client 128. Client 128 is a client to server 126 in this example. Vehicle 116 is also a client that may exchange information with client 126. Vehicle 116 also may exchange information with server 128. Vehicle 116 may exchange data with different computers through a wireless communications link while in-motion or any other type of communications link while at rest. In these examples, server 126, and client 128 may be computers. Network data processing system 122 may include additional servers, clients, and other devices not shown.

In the depicted example, network data processing system 122 is the Internet with network 124 representing a worldwide collection of networks and gateways that use the Transmission Control Protocol/Internet Protocol (TCP/IP) suite of protocols to communicate with one another. Of course, network data processing system 122 also may be implemented as a number of different types of networks, such as for example, an intranet, a local area network (LAN), or a wide area network (WAN).

FIG. 1 is intended as an example, and not as an architectural limitation for different embodiments. It should be appreciated that FIG. 1 is only exemplary and is not intended to assert or imply any limitation with regard to the environments in which different embodiments may be implemented. Many modifications to the depicted environments may be made.

For example, combine 120 and vehicle 116 may be the same device. Combine 120 may be capable of producing energy using renewable resources while harvesting plants 112 from field 114. In other examples, vehicle 116 may not be directly connected to electrical power grid 108. Vehicle 116 may store energy for transportation to a remote location. In another illustrative embodiment, intermediate vehicle 130 may transport material between combine 120 and vehicle 116. In one example, biological material 118 may be transferred directly from combine 120 to intermediate vehicle 130. In another example, combine 120 may deposit biological material 118 on field 114 for later pick up by intermediate vehicle 130.

The different illustrative embodiments recognize and take into account a number of different considerations. For example, the different illustrative embodiments recognize and take into account that it may be desirable to convert biological material remaining in a field after the field has been harvested into energy. The different illustrative embodiments recognize that one solution may involve retrieving the biological material from the field and transporting the biological material to an energy plant. However, the biological material remaining in the field after the field has been harvested may not be capable of producing as much energy as the crops that were harvested. Further, transportation of the biological material to the energy plant may incur costs for fuel. Ultimately, more energy may be spent transporting the biological material to the energy plant than the biological material is capable of producing at the energy plant.

The different illustrative embodiments further recognize and take into account that another solution may involve burning the biological material to produce heat. However, depending on the time of the year heat may not be desired. Thus, the use and value of the biological material as a source of energy may vary.

The different illustrative embodiments further recognize and take into account that conversion of biological material into energy may produce bi-products. Heat and emissions, such as carbon dioxide for example, may be produced using current conversion techniques. The heat and emissions produced may not be used in the conversion of the biological material into energy.

The different illustrative embodiments further recognize and take into account that biological material remaining in a field after the field is harvested may be used to replenish the soil. Use of the biological material in energy production may deprive the soil of nutrients. The soil may become less useful in growing crops, when the biological material is removed.

Thus, the different illustrative embodiments provide a method and apparatus for processing biological material. In one illustrative embodiment a method for processing biological material is provided. A conversion system monitors for biological material in a field while the conversion system moves in the field. The biological material is retrieved from the field to form retrieved biological material in response to detecting the biological material in the field. The retrieved biological material is converted into energy by the conversion system. A first portion of the energy is used to power the conversion system. A second portion of the energy is directed to a remote location.

Figure 2:
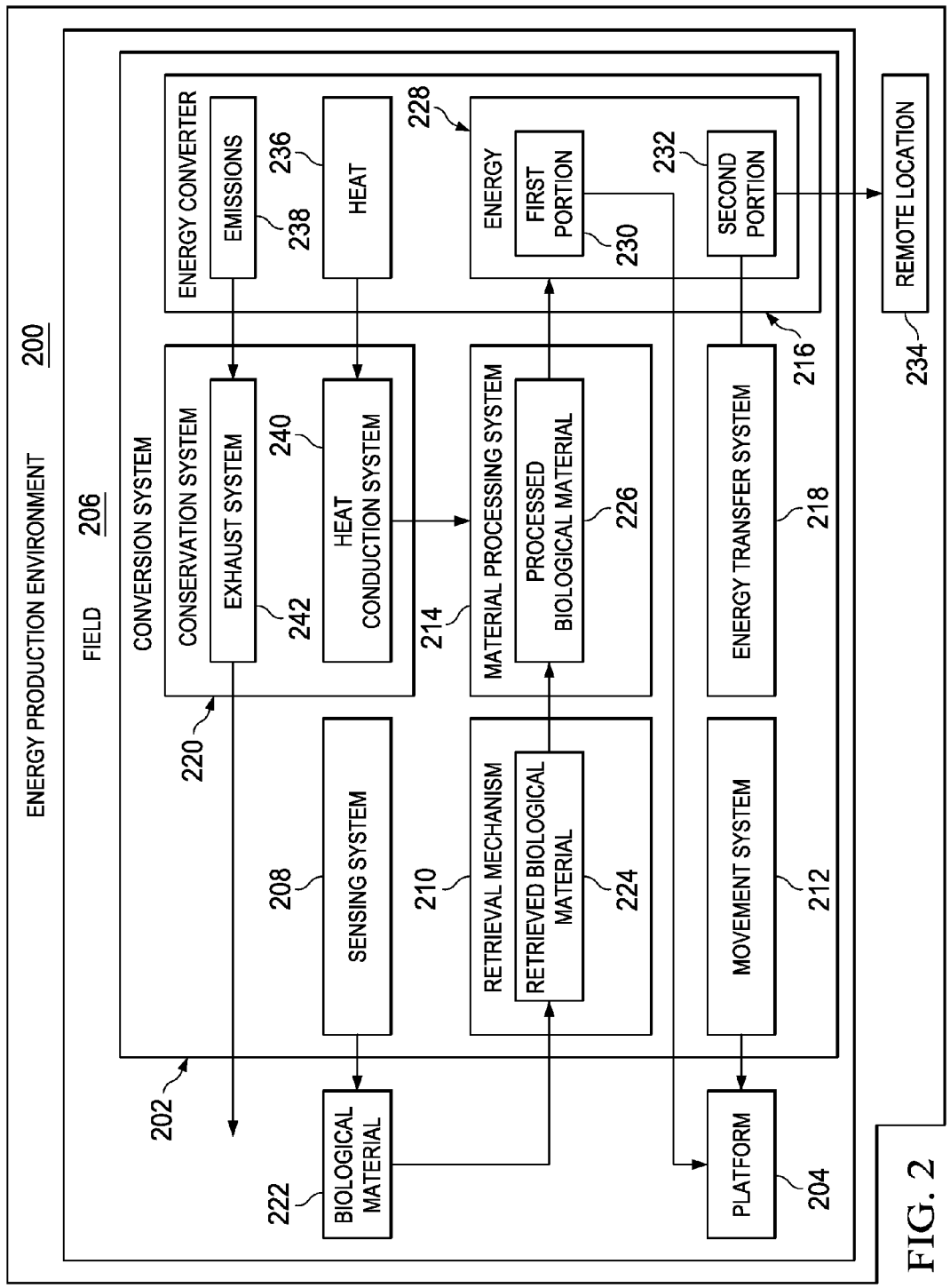
FIG. 2 is a block diagram of an energy production environment in accordance with an illustrative embodiment.

With reference now to FIG. 2, an illustration of an energy production environment is depicted in accordance with an illustrative embodiment. In this illustrative example, energy production environment 100 in FIG. 1 is an example of one implementation of energy production environment 200. As depicted, energy production environment 200 includes conversion system 202, platform 204, and field 206. In this illustrative embodiment, platform 204 may be an example of one implementation of vehicle 116 in FIG. 1.

As depicted, conversion system 202 includes multiple systems and/or devices. Conversion system 202 includes sensing system 208 retrieval mechanism 210, movement system 212, material processing system, 214, energy converter 216, energy transfer system 218, and conservation system 220.

In this illustrative embodiment, both sensing system 208 and movement system 212 are associated with platform 204. For example, both sensing system 208 and movement system 212 may be located on platform 204. Sensing system 208 monitors field 206 for biological material 222. Movement system 212 moves platform 204 through field 206. Thus, movement system 212 may move platform 204 through field 206 as sensing system monitors for biological material 222 in field 206.

As used herein, a first component may considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Retrieval mechanism 210 is also associated with platform 204. Retrieval mechanism 210 retrieves biological material 222 from field 206. Retrieval mechanism 210 may be, for example without limitation, a rotary head, a grasping head, or pneumatic head of a combine. This retrieval may be performed when sensing system 208 has detected biological material 222 in field 206. Biological material 222 that is retrieved using retrieval mechanism 210 may be referred to as retrieved biological material 224.

Retrieved biological material 224 may be sent to material processing system 214. Material processing system 214 processes retrieved biological material 224 into a form that is capable of being converted into energy. Material processing system 214 may be, for example without limitation, a pelletizer, a heater, a dryer, a desiccant adder, and/or an anaerobic digestion container. For example, material processing system 214 may remove moisture from retrieved biological material 224. Material processing system 214 may also compress retrieved biological material 224 into a smaller size that may be transported. Retrieved biological material 224 that is processed using material processing system 210 may be referred to as processed biological material 226.

Processed biological material 226 may be sent to energy converter 216. Energy converter 216 uses processed biological material 226 to produce energy 228. Energy converter 216, may be for example, without limitation, an electric generator, a pyrolysis chamber, and/or an ethanol distillation facility. For example, energy 228 may be, for example, chemical energy stored in the form of a liquid or gas. In another example, energy 228 may be electrical energy that may be transmitted using wires or may be stored in a battery.

Energy transfer system 218 transfers energy 228. For example, energy transfer system 218 may transfer first portion 230 of energy 228 to platform 204. First portion 230 of energy 228 may be used to power one or more systems or devices associated with platform 204. For example, first portion 230 of energy 228 may be used to provide energy for movement system 212 to move platform 204 through field 206. In another example, first portion 230 of energy 228 may be used to provide energy for retrieval mechanism 210 to retrieve biological material 222 from field 206.

Additionally, energy transfer system 218 may direct second portion 232 of energy 228 to remote location 234. For example, remote location 234 may be an electrical energy grid, such as electrical energy grid 108 in FIG. 1. In this example, energy transfer system 218 may include one or more wires and stitches for directing energy 228. Energy transfer system 218 may direct second portion 232 of energy 228 from energy converter 216 to the electrical energy grid using the wires. In another example, energy transfer system 218 may be associated with one or more batteries and/or storage devices for storing energy 228. Energy transfer system 218 may direct second portion 232 of energy 228 to remote location 234 by second portion 232 of energy 228 in the batteries and/or storage devices.

Energy converter 216 may also produce heat 236 and emissions 238 while using processed biological materials 226 to produce energy 228. Heat 236 and emissions 238 may be bi-products produced by energy converter 216 in the production of energy 228. For example, emissions 238 may include greenhouse gasses, such as for example, carbon dioxide, methane, nitrous oxide, and/or other types of greenhouse gasses. Emissions 238 may also include ash from processed biological material 226 used by energy converter 216.

Conservation system 220 manages heat 236 and emissions 238. Conservation system 220 is associated with energy converter 216 and may direct heat 236 and emissions 238 for use in secondary process. For example, conservation system 220 may include heat conduction system 240. Heat conduction system 240 may direct heat 236 to material processing system 214. Material processing system 214 may then use heat 236 to aid in removing moisture from retrieved biological material 224. In another example, conservation system 220 may include exhaust system 242. Exhaust system 242 may direct emissions 238 into soil in field 206. Emissions 238 may replenish nutrients in field 206, so that field 206 can continue to produce biological material.

Thus, conversion system 202 is configured to convert biological material 222 into energy 228. Energy 228 can be produced without the need to use fuel to transport biological material 222 away from field 206. Additionally, conversion system 202 may be configured to produce energy 228 in response to detection of biological material 222 by sensing system 208. Thus, energy 228 may be produced by conversion system 202 autonomously, thus saving labor costs. Further, use of heat 236 and emissions 238 by conservation system 220 may increase the total amount of energy utilized. Conservation system 220 insures that excess heat and emissions are used constructively rather than discarded.

The illustration of energy production environment 200 in FIG. 2 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in one illustrative embodiment, conversion system 202 may be associated with and located on platform 204 and move in field 206. In other embodiments, only certain blocks within conversion system 202 may be associated with and located on platform 204 and move in field 206. For example, sensing system 208, retrieval mechanism 210, and movement system 212 may be located on platform 204 and move in field 206. At least one of material processing system 214, energy converter 216, energy transfer system 218, and conservation system 220 may be physically separate from platform 204. Retrieved biological material 224 may be transported from platform 204 to material processing system 214. Additionally, processed biological material 226 may be transported from platform 204 to energy converter 216. For example, a pneumatic transport system may be used to transport the biological material through a tube using air pressure.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C, or item B and item C.

Yet in other embodiments, certain blocks in energy production environment 200 may be not be included in conversion system 202. For example, sensing system 208 may not be included in conversion system 202. Detection of biological material 222 may be performed manually or by systems that are not a part of conversion system 202. Similarly, retrieval of biological material 222 may be performed manually or by systems that are not a part of conversion system 202. Thus, retrieval mechanism 210 may not be included in conversion system 202. In another example, conservation system 220 may not be part of conversion system 202.

Figure 3:
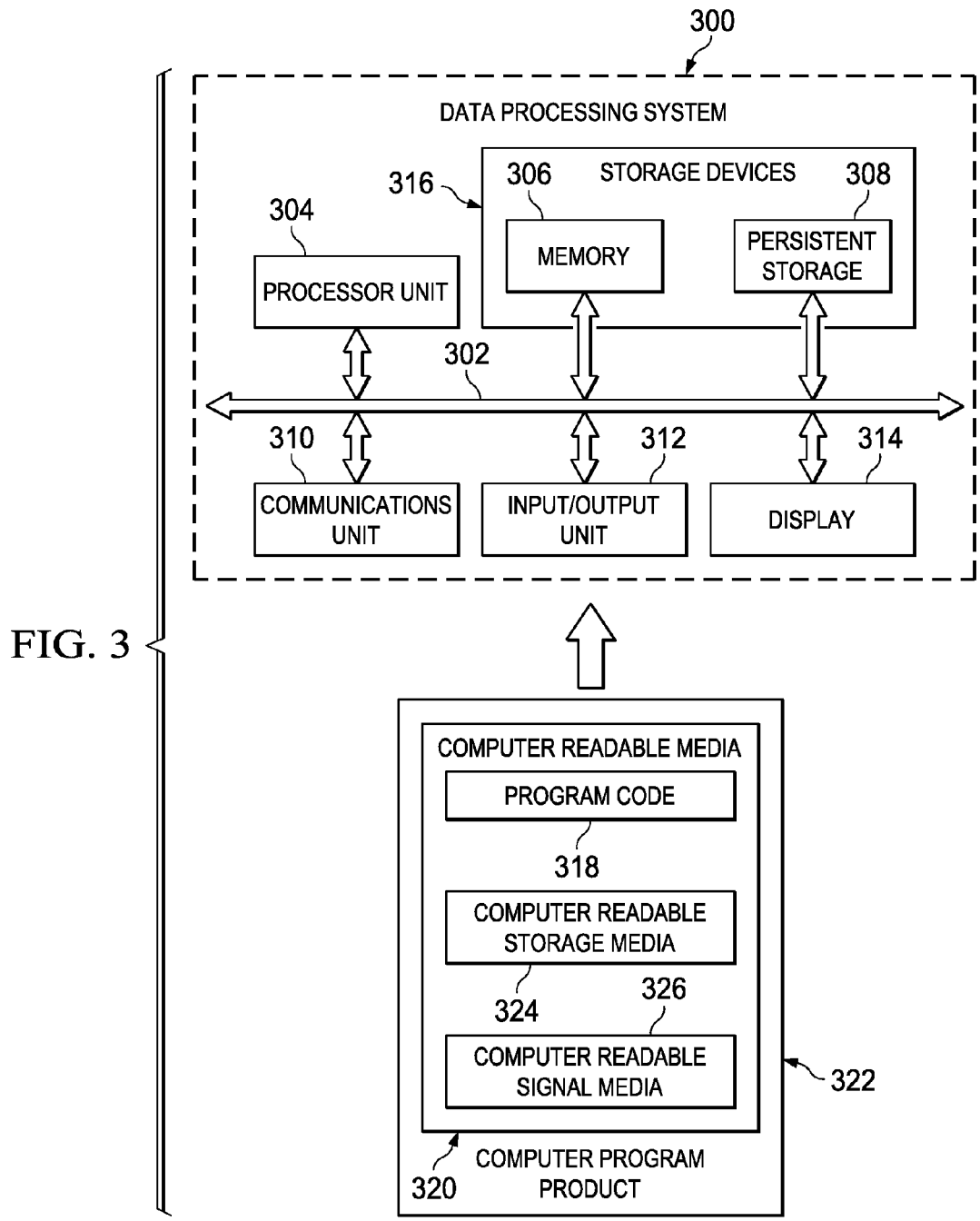
FIG. 3 is a block diagram of data processing system in accordance with an illustrative embodiment.

With reference now to FIG. 3, an illustration of a data processing system is depicted in accordance with an illustrative embodiment. Data processing system 300 is an example of a data processing system that may be used to implement servers and clients, such as server 126 and client 128 in FIG. 1.

In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links. Communications unit 310 may provide for communications among sensing system 208 retrieval mechanism 210, movement system 212, material processing system 214, energy converter 216, energy transfer system 218, and/or conservation system 220.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications and/or programs may be located in storage devices 316, which are in communication with processor unit 304 through communications fabric 302. In these illustrative examples the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory, that is connected to data processing system 300. In some instances, computer readable storage media 324 may not be removable from data processing system 300. In these illustrative examples, computer readable storage media 324 is a non-transitory computer readable storage medium.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 318 may be downloaded over a network to persistent storage 308 from another device or data processing system through computer readable signal media 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different advantageous embodiments may be implemented in a data processing system including components in addition to or in place of those illustrated for data processing system 300. Other components shown in FIG. 3 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache such as found in an interface and memory controller hub that may be present in communications fabric 302.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

Figure 4:
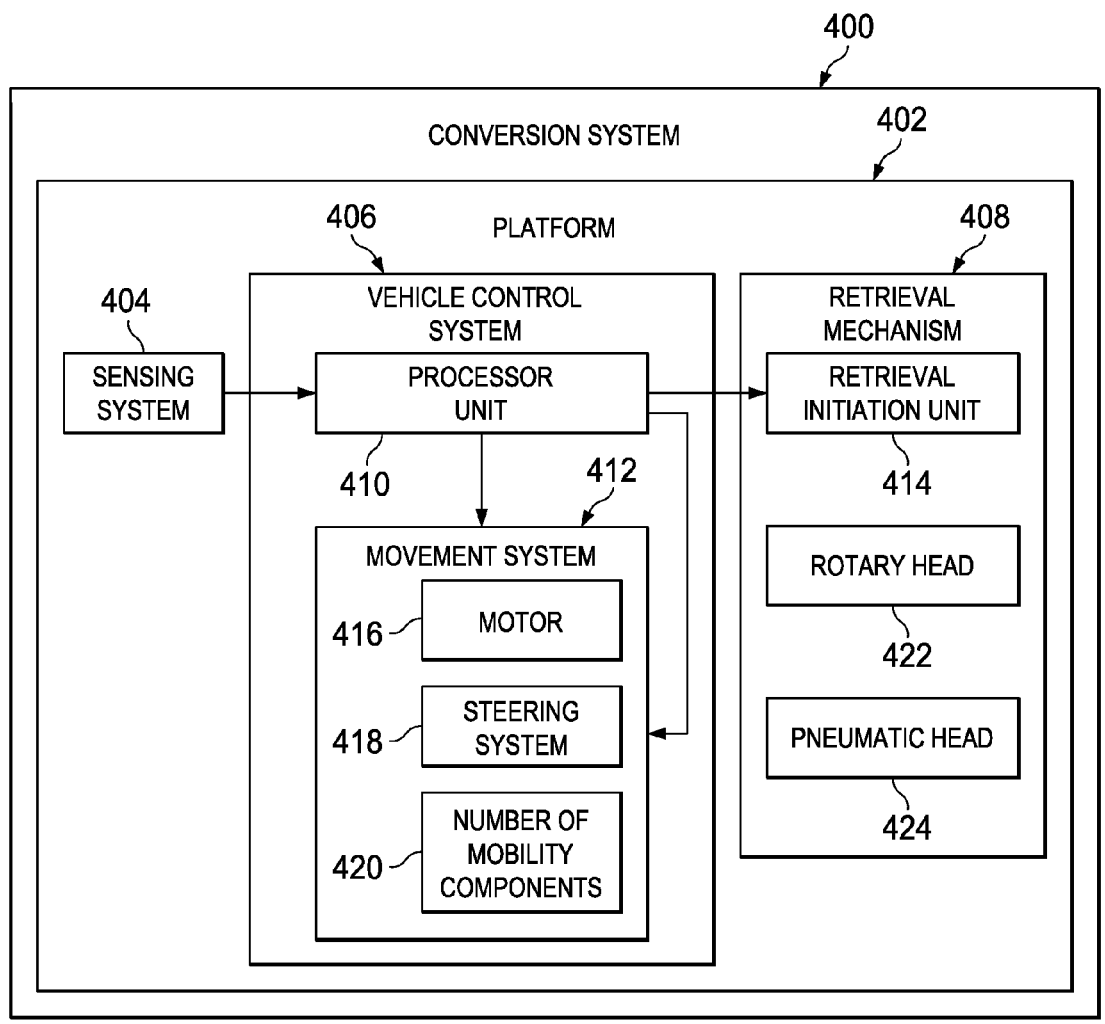
FIG. 4 is a block diagram of a conversion system in accordance with an illustrative embodiment.

With reference now to FIG. 4, a block diagram of a conversion system is depicted in accordance with an illustrative embodiment. In this illustrative example, conversion system 400 includes platform 402, sensing system 404, vehicle control system 406, and retrieval mechanism 408. In this illustrative embodiment, vehicle control system 406 is an example of one implementation of data processing system 300 in FIG. 3.

In this illustrative embodiment, vehicle control system 406 controls functions of conversion system 400. Vehicle control system 406 includes processing unit 410, and movement system 412. Vehicle control system 406 may receive data from sensing system 404. The data received from sensing system 404 may include for example, information regarding a location and position of platform 402 and/or a location of biological material in a field, such as biological material 222 in field 206.

Based on the data received from sensing system 404, vehicle control system 406 may direct operations for various components in conversion system 400. In one example, processor unit 410 in vehicle control system 406 may execute instructions to control operations performed by retrieval mechanism 408. Instructions may be received by retrieval initiation unit 414. For example, the instructions received may direct retrieval mechanism 408 to begin retrieving the biological material from the field.

In another example, processor unit 410 in vehicle control system 406 may execute instructions to control operations performed by movement system 412. Based on the data received from sensing system 404, movement system 412 may receive instructions to move platform 402. For example, movement system 412 may move platform 402 using motor 416. In this example, motor 416 is associated with platform 402 and configured to move platform 402. Motor 416 may cause platform 402 to accelerate or decelerate based on the instructions received.

For example, motor 416 may be an electric motor incorporated into a mobility component, such as a wheel, that drives the mobility component directly. In another example, motor 416 may be an internal combustion engine that produces movement through combustion of fuel. In one illustrative embodiment, motor 416 may include a different motor for each wheel. Steering may be accomplished by differentially controlling each of the separate motors.

Additionally, movement system 412 may move platform 402 using steering system 418. In this example, steering system 418 is associated with platform 402. Steering system is configured to provide mobility for platform 402. Steering system 404 may be, for example, without limitation, an electrically controlled hydraulic steering system, an electrically driven rack and pinion steering system, a differential steering system, or some other suitable steering system.

Further, movement system 412 includes number of mobility components 420. Number of mobility components 420 provides autonomous vehicles with the capability to move in a number of directions and/or locations in response to instructions received from processor unit 410. Number of mobility components 420 may be, for example, without limitation, wheels, tracks, feet, rotors, propellers, wings, and/or other suitable components.

In this illustrative embodiment, vehicle control system 406 may also direct operations for sensing system 404. For example, vehicle control system 406 may send instructions to sensing system 404 to monitor for biological material. In one example, sensing system 404 may monitor for biological material while platform 402 moves in the field. Sensing system 404 may also be programmed to monitor for biological material periodically. Alternatively, vehicle control system 406 receives a request to monitor for biological material from an external source, such as a user input, for example.

In this illustrative embodiment, retrieval mechanism 408 is configured to retrieve biological material from a field. Retrieval mechanism 408 may include any number of components to retrieve biological material. For example, retrieval mechanism 408 may include rotary head 422. Rotary head 422 may be positioned on platform 402 near the surface of the field. As platform 402 moves through the field, components within rotary head 422 may be rotated to lift biological material from the surface.

In another example, retrieval mechanism 408 may include pneumatic head 424. Pneumatic head 424 may use fans or compressors to create suction within pneumatic head 424. As platform 402 moves through the field, suction within pneumatic head 424 may cause biological material to be lifted from the surface. Yet in other embodiments, any number of components suitable for retrieving biological material from a field may be used in place of or in addition to rotary head 422 and/or pneumatic head 424. For example, retrieval mechanism 408 may include a combine, a tractor, a harvester, a thrasher, and/or a gleaner.

The illustration of conversion system 400 in FIG. 4 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in one illustrative embodiment, sensing system 404 may be physically separate from platform 402. Sensing system 404 may be stationary or may move in the field independently of platform 402. Data may be sent from sensing system 404 to vehicle control unit 406 using wired and/or wireless communication connections. In other embodiments, vehicle control system 406 may control functions of conversion system 400 remotely.

Figure 5:
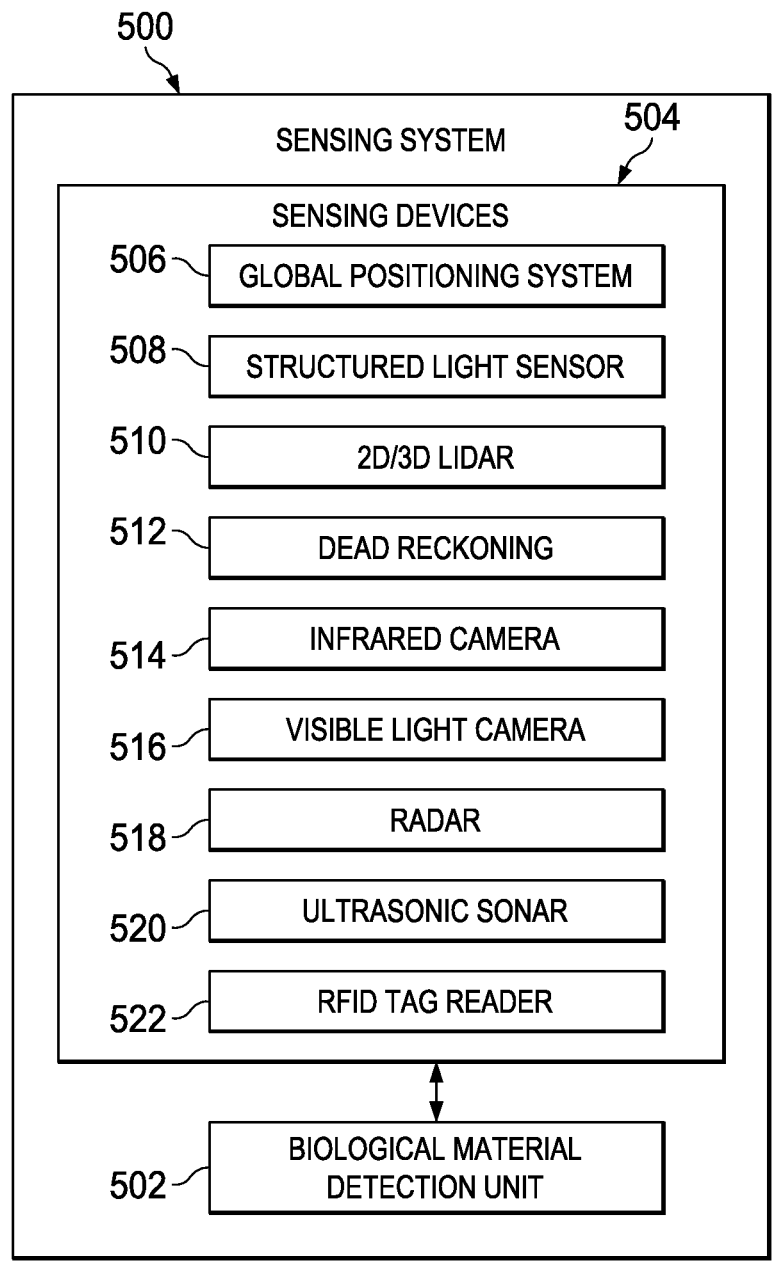
FIG. 5 is a block diagram of a sensing system in accordance with an illustrative embodiment.

With reference now to FIG. 5, a block diagram of a sensing system is depicted in accordance with an illustrative embodiment. Sensing system 500 includes biological material detection unit 502 and sensing devices 504. In this illustrative embodiment, sensing system 500 is an example of one implementation of sensing system 200 in FIG. 2. Biological material detection unit 502 may use any number of different sensing devices in sensing devices 504 to detect biological material in a field.

As illustrated, sensing system 500 includes sensing devices 504 which may include for example, global positioning system 506, structured light sensor 508, two dimensional/three dimensional lidar 510, dead reckoning 512, infrared camera 514, visible light camera 516, radar 518, ultrasonic sonar 520, and radio frequency identification reader 522. These different sensors may be used to identify the environment around a vehicle, such as, for example, field 114 and vehicle 116 in FIG. 1. Sensing devices 504 in sensing system 500 may be selected such that one of the sensors is always capable of sensing information needed to operate the vehicle in different operating environments.

Global positioning system 506 may identify the location of the vehicle with respect to other objects and/or materials in the field. Global positioning system 506 may be any type of radio frequency triangulation scheme based on signal strength and/or time of flight. Structured light sensor 508 emits light in a pattern, such as one or more lines, reads back the reflections of light through a camera, and interprets the reflections to detect and measure biological material in the field. Two dimensional/three dimensional lidar 510 is an optical remote sensing technology that measures properties of scattered light to find range and/or other information of a distant target. Two dimensional/three dimensional lidar 510 emits laser pulses as a beam, and then scans the beam to generate two dimensional or three dimensional range matrices. The range matrices are used to determine distance to materials or objects by measuring the time delay between transmission of a pulse and detection of the reflected signal.

Dead reckoning 512 begins with a known position, which is then advanced, mathematically or directly, based upon known speed, elapsed time, and course. The advancement based upon speed may use the vehicle odometer, or ground speed radar, to determine distance traveled from the known position. Infrared camera 514 detects heat indicative of a living thing versus an inanimate object. An infrared camera may also form an image using infrared radiation. Visible light camera 516 may be a standard still-image camera, which may be used alone for color information or with a second camera to generate stereoscopic or three-dimensional images. When visible light camera 516 is used along with a second camera to generate stereoscopic images, the two or more cameras may be set with different exposure settings to provide improved performance over a range of lighting conditions. Visible light camera 516 may also be a video camera that captures and records moving images.

Radar 518 uses electromagnetic waves to identify the range, altitude, direction, or speed of both moving and fixed obstacles. Radar 518 is well known in the art, and may be used in a time of flight mode to calculate distance to materials, as well as Doppler mode to calculate the speed of an object. Ultrasonic sonar 520 uses sound propagation on an ultrasonic frequency to measure the distance to materials by measuring the time from transmission of a pulse to reception and converting the measurement into a range using the known speed of sound. Ultrasonic sonar 520 is well known in the art and can also be used in a time of flight mode or Doppler mode, similar to radar 518. Radio frequency identification reader 522 relies on stored data and remotely retrieves the data using devices called radio frequency identification (RFID) tags or transponders.

Sensing system 500 may retrieve data from one or more of sensing devices 504 to obtain different perspectives of the field. For example, sensing system 500 may obtain visual data from visible light camera 516, data about the distance of the vehicle in relation to materials and objects in the field from two dimensional/three dimensional lidar 510, and location data of the vehicle in relation to a map from global positioning system 506.

In this illustrative embodiment, biological material detection unit 502 is used to detect biological material in the field. Biological material detection unit 502 uses data acquired from sensing devices 504 to identify locations and amounts of biological materials. For example, biological material detection unit 502 may detect biological material by sending out and receiving a plurality of signals. Biological material detection unit 502 may incorporate any number of sensing devices in sensing devices 504 to detect the biological material.

In one embodiment, biological material detection unit 502 may detect a row of biological material remaining in a field after the field has been harvested. For example, a field may be harvested by a combine. The combine collects crops grown in the field and discards unwanted biological materials in a row on the field. The row of biological materials may have a height that is greater than the surrounding surface of the field. For example, without limitation, the row of biological materials may then be detected using structured light sensor 508, two dimensional/three dimensional lidar 510 radar 518, and/or ultrasonic sonar 520.

In other embodiments, additional materials such as radio frequency identification tags and/or colored dyes may be left in the row of biological material by the combine. The biological material detection unit 502 may detect the radio frequency identification tags and/or colored dyes to locate the row of biological material in the field. For example without limitation, radio frequency identification reader 522, global positioning system 506, structured light sensor 508 and/or visible light camera 516 may be used to locate the additional materials.

The illustration of sensing system 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, sensing system 500 may only include one or more of sensing devices 504 in detecting biological material and/or other objects in the field. In another example, sensing system 500 may include more than one device in sensing devices 504 that work in combination to detect biological material and/or other objects in the field.

Figure 6:
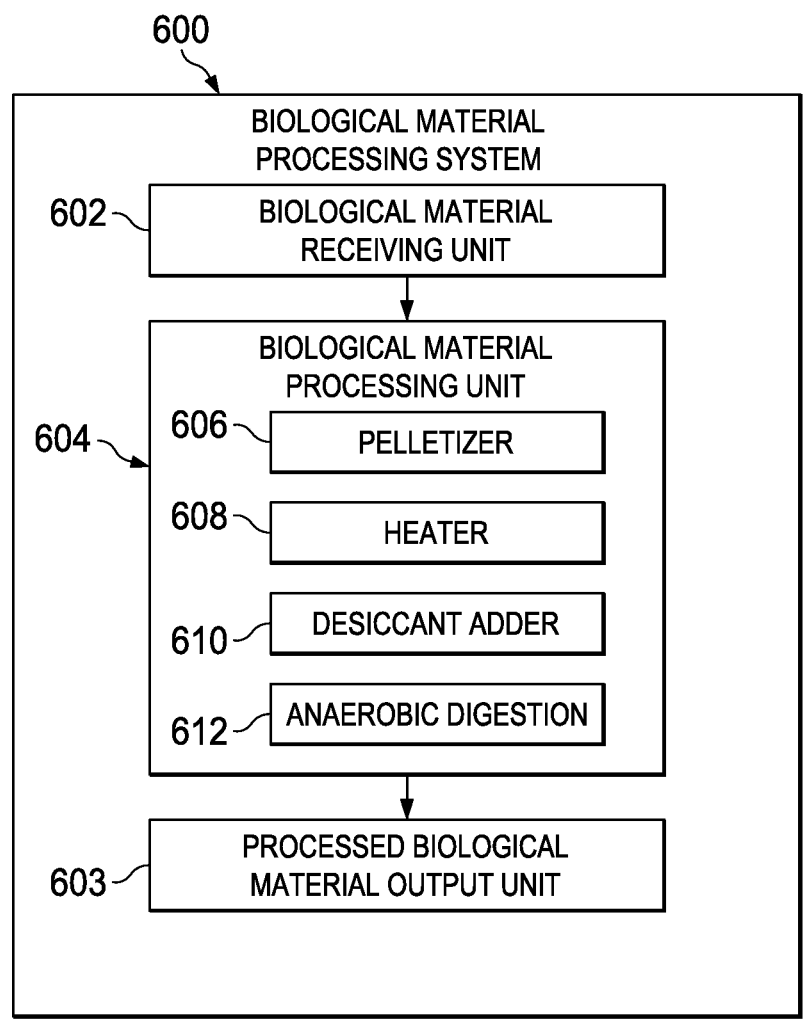
FIG. 6 is a block diagram of a biological material processing system in accordance with an illustrative embodiment.

With reference now to FIG. 6, a block diagram of a biological material processing system is depicted in accordance with an illustrative embodiment. As illustrated, biological material processing system 600, includes biological material receiving unit 602, biological material processing unit 604, and processed biological material output unit 606. In this illustrative embodiment, biological material processing system 600 is an example of one implementation of material processing system 214 in FIG. 2.

In this embodiment, biological material receiving unit 602 receives biological material. The biological material may be transported to biological material receiving unit 602 from a retrieval mechanism, such as retrieval mechanism 210 in FIG. 2.

Biological material processing unit 604 processes the biological material into a form that is capable of being converted into energy. Biological material processing unit 604 may include a number of processes and devices in processing biological material. For example, biological material processing unit 604 may remove moisture from biological material. Dryer biological material may be more efficiently converted into energy than wetter biological material. For example, without limitation, moisture may be removed by heating the biological material, compressing the biological material, adding chemicals and/or bacteria to the biological material, and/or any other suitable methods of removing moisture.

In one example, pelletizer 606 may compress the biological material to remove moisture. Additionally, pelletizer 606 may compress the biological material into a smaller size, such as a pellet, which may be easier to handle than non-compressed biological material. In another example, heater 608 may be used to heat the biological material to remove moisture.

Additionally, chemicals and/or bacteria may be added to the biological material to process the biological material. For example, desiccants may be added to the biological material by desiccant adder 610. A desiccant is a substance that induces or sustains a state of dryness in materials within proximity of the desiccant. In another example, anaerobic digestion 612 may be used to process biological material. Anaerobic digestion is a series of processes in which bacteria break down biological material in the absence of oxygen.

In response to the processing of the biological material, biological material output unit 603 directs the biological material to be converted into energy. For example, biological material output unit 603 may transport the biological material to an energy converter such as energy converter 216 in FIG. 2.

Figure 7:
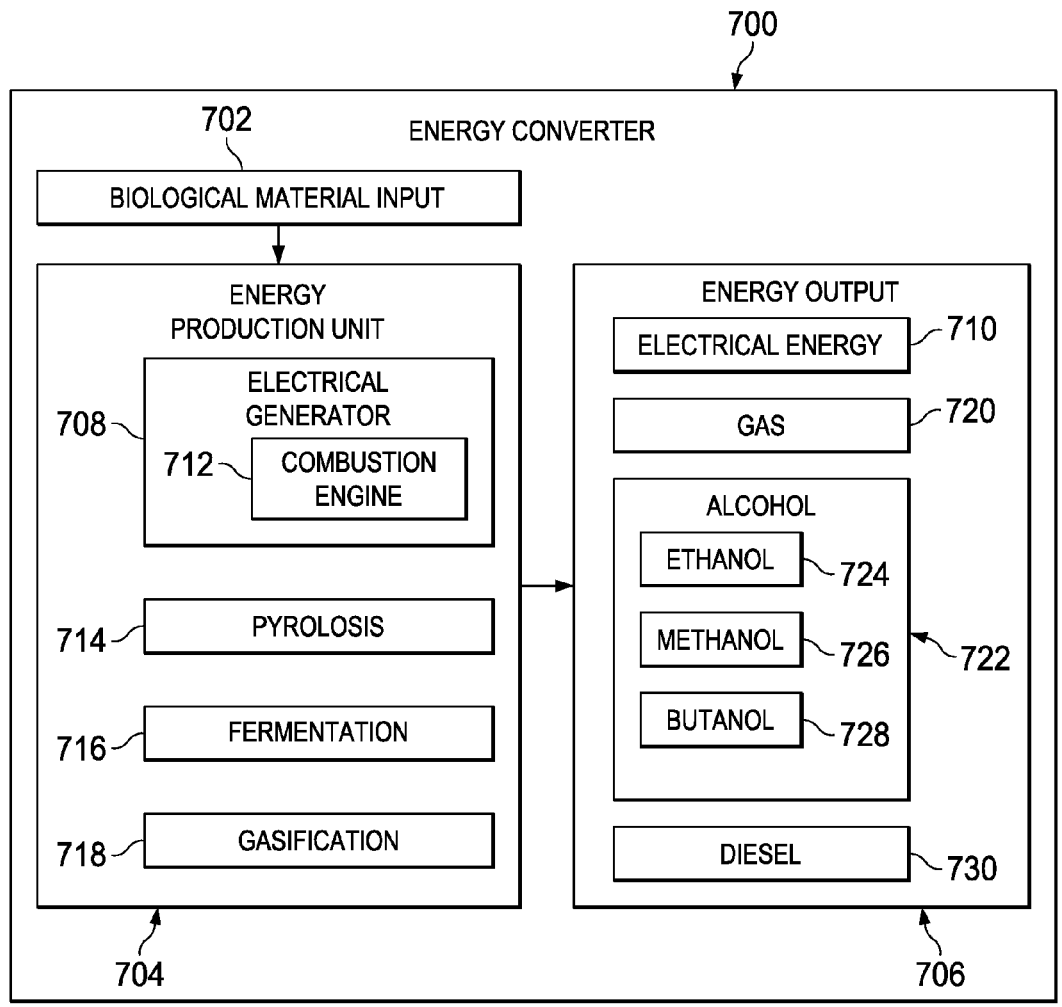
FIG. 7 is a block diagram of an energy converter in accordance with an illustrative embodiment.

With reference now to FIG. 7, a block diagram of an energy converter is depicted in accordance with an illustrative embodiment. As depicted, energy converter 700 includes biological material input 702, energy production unit 704, and energy output 706. In this illustrative embodiment, energy converter 700 is an example of one implementation of energy converter 216 in FIG. 2.

Energy production unit 704 uses the biological material to produce energy. For example, energy production unit 704 may use electric generator 708 to produce electrical energy 710. Electric generator 708 may burn the biological material using combustion engine 712 to generate mechanical energy. The mechanical energy may be converted in to electrical energy 710 by rotating wires in the presence of a magnetic field in electric generator 708.

In another example, energy production unit 704 may produce energy by converting the biological material into a fuel. For example, energy production unit 704 may convert the biological material using processes including, without limitation, pyrolosis 714, fermentation 716, and/or gasification 718. Pyrolosis 714 is the use of heat to break the biological materials down into char, tars, oil and hydrocarbon gas in the absence of oxygen. Fermentation 716 is a process for adding yeasts to biological materials to produce alcohol. Gasification 718 is a process that involves heating the biological materials. Then the heating the biological materials are reacted with oxygen and/or steam to produce gas.

For example, without limitation, fuels produced by energy production unit 704 may include gas 720; alcohol 722, which may include ethanol 724, methanol 726, and/or butanol 728; and diesel 730.

Figure 8:
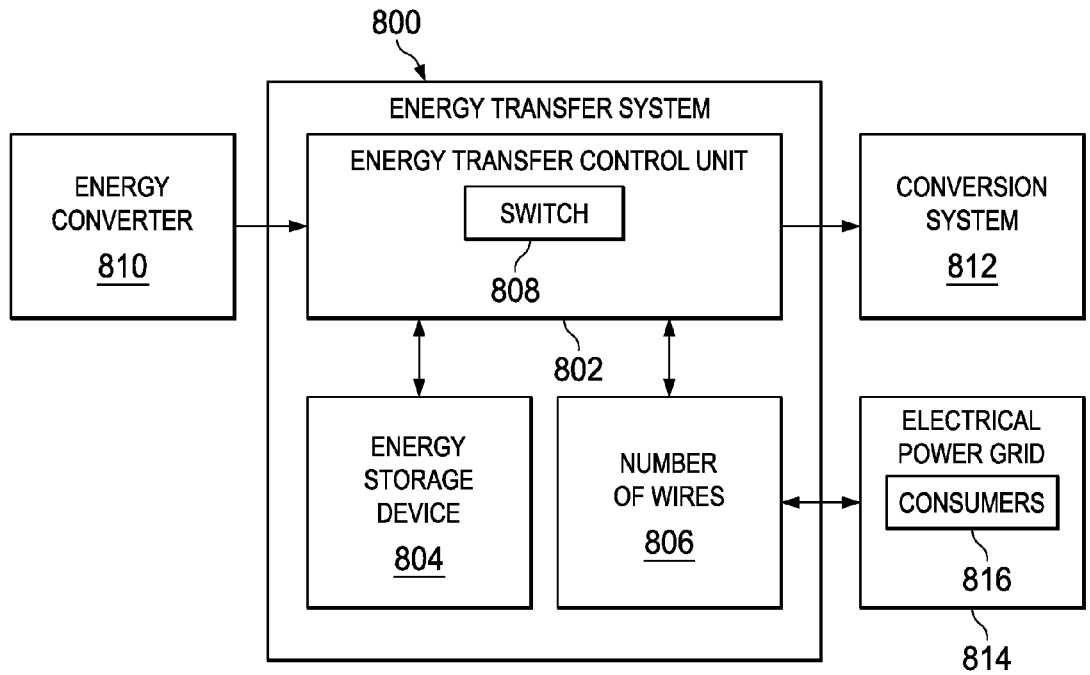
FIG. 8 is a block diagram of an energy transfer system in accordance with an illustrative embodiment.

With reference now to FIG. 8, a block diagram of an energy transfer system is depicted in accordance with an illustrative embodiment. As depicted, energy transfer system 800 includes energy transfer control unit 802, energy storage device 804, and number of wires 806. In this illustrative embodiment, energy transfer system 800 is an example of one implementation of energy transfer system 218 in FIG. 2.

As depicted, energy transfer control unit 802 includes switch 808 to direct the flow of energy. Energy transfer control unit 802 receives energy produced by energy converter 810. Energy transfer control unit 802 may direct energy produced by energy converter 810 to conversion system 812. Conversion system 812 may be an example of one implementation of conversion system 202 in FIG. 2. Conversion system 812 may use the energy received to power devices associated with conversion system 812.

Additionally, for example, energy transfer control unit 802 may direct energy produced by energy converter 810 to energy storage device 804. Energy storage device 804 may be a battery, a fuel tank, and/or any other device suitable for storing energy.

In another example, energy transfer control unit 802 may direct energy produced by energy converter 810 to electrical power grid 814 using number of wires 806. Thus, energy converter 810 may supply energy to consumers 816 of the energy connected to electrical power grid 814.

Additionally, a credit may be provided for an amount of energy directed to electrical power grid 814. The credit may be a credit for an energy bill. For example, the amount of energy provided to electrical power grid 814 may offset an amount of energy received from electrical power grid 814.

In this illustrative embodiment, energy transfer control unit 802 may also be configured to direct energy from electrical power grid 814 to conversion system 812 using number of wires 806 and switch 808. The energy from electrical power grid 814 may be used to power devices associated with conversion system 812 for a period of time.

Additionally, energy transfer control unit 802 may be configured to direct energy from energy storage device 804 to conversion system 812. The energy from electrical power grid 814 may be used to power devices associated with conversion system 812 for a period of time. For example, gas from energy storage device 804 may be used to power a motor associated with conversion system 812 for a period of time.

Energy transfer control unit 802 may monitor the energy received from energy converter 810 to determine whether it is sufficient to power the devices associated with conversion system 812. If there is sufficient power energy transfer control unit 802 may stop the receipt of energy from electrical power grid 814 and/or energy storage device 804 using switch 808. Thus, conversion system 812 may operate without the need for any energy from external sources. Additionally, conversion system 812 supplies energy to external sources.

With reference now to FIG. 9, a block diagram of a conservation system is depicted in accordance with an illustrative embodiment. As depicted, conservation system 900 includes conservation system control unit 902, heat conduction system 904, and exhaust system 908. In this illustrative embodiment, conservation system 900 is an example of one implementation of conservation system 220 in FIG. 2.

In this illustrative embodiment, conservation system control unit 902 controls the use of heat 906 and emissions 910 produced during an energy conversion process. Conservation system control unit 902 may be used to provide energy efficient uses for heat 906 and emissions 910. Conservation system control unit 902 use heat conduction system 904, and exhaust system 908 to direct the flow of heat 906 and emissions 910 in conservation system 900. For example, without limitation, heat conduction system 904 and exhaust system 908 may include any number of ducts, vents, pipes, conductors, insulators, and/or any other materials suitable for the transfer of heat and emissions.

As depicted, conservation system control unit 902 includes pre-programming unit 912 and environmental detection unit 914. Conservation system control unit 902 may use pre-programming unit 912 and environmental detection unit 914 to make decisions on how to use heat 906 and emissions 910. For example, pre-programming unit 912 may include instructions on how to use heat 906 and emissions 910.

Conservation system control unit 902 may also communicate with a vehicle control system, such as vehicle control system 406 in FIG. 4, to receive instructions on how to use heat 906 and emissions 910. For example, conservation system control unit 902 may receive a request for heat 906 for use by biological material processing system 911. Conservation system control unit 902 may then use heat conduction system 904 to transfer heat 906 to biological material processing system 911. Biological material processing system 911 may then heat 906 in processing biological material. In another example, conservation system control unit 902 may receive a notification that heat 906 is no longer needed by biological material processing system 911. Conservation system control unit 902 may then direct heat 906 to another location.

In this illustrative embodiment, conservation system control unit 902 may receive information from environmental detection unit 914 in making decisions. For example, conservation system control unit 902 may receive temperature information from temperature detection unit 916. If the temperature reading is below a certain level, conservation system control unit 902 may use heat conduction system 904 to transfer heat 906 to building 918.

In this illustrative embodiment, conversion system 900 may also include algae production environment 920. Algae production environment 920 may be associated with a platform such as platform 204, in FIG. 2. For example, algae production environment 920 may be a pool of water that is positioned on, in proximity of, or connected to the platform. For example, algae production environment 920 may be a trailer that is connected to the platform and movable with the platform in a field. In another example, production environment 920 may be a pond of water. Conservation system 900 may direct emissions 910 and heat 906 to the pond using tubes and/or other conductors.

Conservation system control unit 902 may direct emissions 910 and heat 906 to algae production environment 920. Emissions 910 and heat 906 may be useful in algae production environment 920 to grow algae. The algae grown may be harvested and used by an energy converter, such as energy converter 216 in FIG. 2, to produce energy.

Conservation system control unit 902 may receive temperature information from temperature detection unit 916 and/or sunlight information from sunlight detection unit 922. Based on the information received, conservation system control unit 902 may determine that temperature and sunlight levels are appropriate for growth of algae in algae production environment 920. For example, if low levels of temperature are detected in algae production environment 920, heat 906 may be directed to algae production environment 920. Additionally, if low levels of sunlight are detected, conservation system control unit 902 may direct energy produced by the energy converter to provide light to algae production environment 920.

As depicted, exhaust system 908 includes cultivator 924. Cultivator 924 may be used by exhaust system 908 to direct emissions 910 into soil 926. For example, emissions 910 may be ash from an energy conversion process. Soil 926 may use ash to increase soil fertility for growing crops. Thus, exhaust system 908 may be used to replenish nutrients in soil 926. In these examples, cultivator 924 may be any device for stirring and/or mixing materials into soil 926. For example cultivator 924 may also be a tiller.

The illustration of biological material processing system 600 in FIG. 6, energy converter 700 in FIG. 7, energy transfer system 800 in FIG. 8, and conservation system 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, a transportation system may be employed to transport biological material to and from biological material processing system 600 in FIG. 6 and energy converter 700 in FIG. 7. In other examples, one or more storage devices may be used to store energy produced by energy converter 700 in FIG. 7. In other examples, conservation system 900 in FIG. 9 may not include heat conduction system 904, and/or exhaust system 908. Biological material may be placed directly on an energy converter to absorb heat from the energy converter without the need of a separate heat conduction system.

Figure 10:
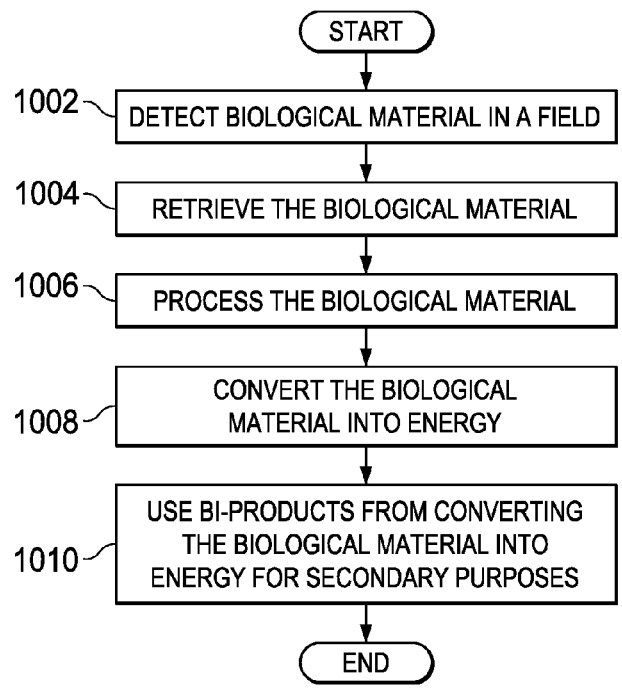
FIG. 10 is a flowchart illustrating a process for processing biological material in accordance with an illustrative embodiment.

With reference now to FIG. 10, a flowchart illustrating a process for processing biological material depicted in accordance with an illustrative embodiment. In this example, the process illustrated is a process for processing biological material. The process may be implemented in a conversion system such as conversion system 202, in FIG. 2. More specifically, the process may be implemented in a conversion system such as conversion system 400, in FIG. 4.

The process begins by detecting biological material in a field (step 1002). The biological material may or may not have been previously harvested. In step 1002, a sensing system, such as sensing system 208 in FIG. 2, may detect a row of biological material in the field. For example, the sensing system may be programmed to periodically monitor for biological material. The sensing system may also monitor for biological material in response to receiving a command. The process then retrieves the biological material (step 1004). In step 1004, a retrieval mechanism, such as retrieval mechanism 210 in FIG. 2, may retrieve the biological material from the field.

Thereafter, the process processes the biological material (step 1006). In step 1006, the biological material may be processed into a form that is capable of being converted into energy. The biological material may be processed by removing moisture from, heating and/or compressing the biological material. Chemicals and/or bacteria may also be added to process the biological material. The process then converts the biological material into energy (step 1008). In step 1008, the biological material may be converted into a gas or liquid form of energy. The biological material may also be used to generate electrical energy. The process then uses bi-products from converting the biological material into energy for secondary purposes (step 1010), with the process terminating thereafter. In step 1010, bi-products may include heat and emissions. The secondary purposes may include, for example, without limitation, heating biological material to be converted into energy, heating buildings, replenishing soil with nutrients, and growing algae for additional energy production.

With reference now to FIG. 11, a flowchart illustrating a process for directing the flow of energy in a conversion system depicted in accordance with an illustrative embodiment. In this example, the process illustrated is a process for directing the flow of energy in a conversion system. The process may be implemented in a conversion system such as conversion system 202, in FIG. 2. More specifically, the process may be implemented in an energy transfer system such as energy transfer system 800, in FIG. 8.

The process begins by receiving energy from an energy source to power a conversion system (step 1102). In step 1102, the conversion system may use the energy received to power devices associated with the conversion system for an initial period of time. For example, the energy source may be an external energy source such as an electrical energy grid. The energy source may also be an internal energy sources such as a fuel tank. The process then determines whether the conversion system has begun producing energy (step 1104). If the process determines that the conversion system has not begun producing energy, the process returns to step 1102.

If the process determines that the conversion system has begun producing energy, the process determines whether it is desired to power devices associated with the conversion system using energy produced by the conversion system (step 1106). If the process determines that it is not desired to power devices associated with the conversion system using energy produced by the conversion system, the process supplies energy produced by the conversion system to a remote location (step 1116), with the process terminating thereafter.

If the process determines that it is desired to power devices associated with the conversion system using energy produced by the conversion system, the process then uses energy from the conversion system to power the devices associated with the conversion system (step 1108). In step 1106, the energy produced by the conversion system may be used to power some but not all devices associated with the conversion system. The energy produced by the conversion system may also be used to partially power the devices associated with the conversion system. Thereafter, the process determines whether energy produced by the conversion system is sufficient to power the devices associated with the conversion system (step 1110). In step 1110, the energy produced by the conversion system may reach a level that is capable of powering all devices associated with the conversion system without energy from external sources.

If the process determines that energy produced by the conversion system is not sufficient to power the devices associated with the conversion system, the process returns to step 1110. If the process determines that energy produced by the conversion system is sufficient to power the devices associated with the conversion system, the process stops receiving energy from the energy source (step 1112). In step 1112, a switch may be used to stop the receipt of energy from the energy source.

Thereafter, the process determines whether an amount of energy produced by the conversion system is greater than an amount of energy being used by the devices associated with the conversion system (step 1114). If the process determines that the amount of energy produced by the conversion system is not greater than the amount of energy being used by the devices associated with the conversion system, the process returns to step 1114. If the process determines that the amount of energy produced by the conversion system is greater than the amount of energy being used by the devices associated with the conversion system, the process supplies energy produced by the conversion system to a remote location (step 1116), with the process terminating thereafter.

The flowcharts and block diagrams in the different depicted embodiments illustrate the architecture, functionality, and operation of some possible implementations of apparatus and methods in different illustrative embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different illustrative embodiments provide a method and apparatus for processing biological material. A conversion system monitors for biological material remaining in a field that has been harvested while the conversion system moves in the field. The biological material is retrieved from the field to form retrieved biological material in response to detecting the biological material remaining in the field after the field has been harvested. The retrieved biological material is processed to form a processed biological material that is capable of being converted into energy. The processed biological material is converted into energy. A first portion of the energy is used to power the conversion system. A second portion of the energy is directed to a remote location. Heat from converting the biological material into energy is used to process the biological material to form the processed biological material.

The use of the conversion system in the field produces greater net energy than transportation of the biological material to a separate processing facility. Infield production of energy reduces fuel costs due to transportation. Reducing fuel costs produces greater net energy from conversion of the biological material into energy. Further, connecting the conversion system to the electrical power grid allows the energy produced to be directly supplied to consumers of the energy. Using the conversion system, biological material remaining in a field may be converted into energy that may be used locally or transported remotely for a profit.

The conversion system may be configured to detect and produce energy from biological material without human intervention. The conservation system uses heat and emissions produced in the production of the energy to produce additional biological materials for energy production. Further, the production of the energy is made more efficient by the use of the energy produced by the conversion system to power the conversion system.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:
- a platform;
- a sensing system associated with the platform and configured to monitor for biological material in a field;
- a retrieval mechanism associated with the platform and configured to retrieve the biological material from the field to form retrieved biological material in response to the sensing system detecting the biological material in the field;
- a movement system associated with the platform and configured to move the platform through the field;
- an energy converter associated with the platform and configured to convert the retrieved biological material into energy; and
- an energy transfer system configured to direct a portion of the energy to a remote location.

2. The apparatus of claim 1, wherein the portion is a first portion, wherein the energy converter is operably connected to the movement system and configured to transfer a second portion of the energy to the movement system, and further comprising:
- a material processing system configured to process the retrieved biological material to form a processed biological material that is capable of being converted into energy; and
- a conservation system configured to direct heat produced by converting the processed biological material into energy to the material processing system to process the retrieved biological material to form the processed biological material.

3. The apparatus of claim 1, wherein the energy is generated energy and further comprising:
- a switch in the energy transfer system, wherein the switch is configured to allow devices associated with the platform to receive additional energy from an energy source until the generated energy is sufficient to power the devices associated with the platform.

4. The apparatus of claim 3, wherein the additional energy is electrical energy, and further comprising:
- a wire in the energy transfer system, wherein the energy transfer system is configured to use the wire to receive the electrical energy, wherein the energy transfer system is configured to direct the second portion of the generated energy to the remote location using the wire in response to a determination that the generated energy is sufficient to power the devices associated with the platform.

5. The apparatus of claim 1, wherein the energy is at least one of electrical energy, energy in a form of chemicals configured to be converted to electrical energy using a fuel cell, energy in a form of combustible liquids, and energy in a form of combustible gases and wherein the energy transfer system is configured to direct the second portion of the energy to a remote location by at least one of directing the electrical energy to an electrical energy grid and storing at least one of the energy in a form of chemicals, the energy in the form of combustible liquids, and the energy in the form of combustible gases in a storage device.

6. The apparatus of claim 1, wherein the retrieval mechanism, the movement system, the material processing system, the energy converter, the energy transfer system, and the conservation system are located within the platform.

7. The apparatus of claim 1, wherein the material processing system configured to remove moisture from the retrieved biological material to process the retrieved biological material to form the processed biological material that is capable of being converted into energy.

8. The apparatus of claim 7, wherein the material processing system is configured to removing the moisture from the retrieved biological material by at least one of compressing the retrieved biological material, heating the retrieved biological material, and adding chemicals that remove moisture from the retrieved biological material to the retrieved biological material.

9. The apparatus of claim 1 further comprising:
- an exhaust system configured to direct emissions produced by the energy converter into soil in the field.

10. The apparatus of claim 1 further comprising:
- an exhaust system configured to direct emissions produced by the energy converter and the heat produced by the energy converter into a fluid containing additional biological material for energy conversion.

11. The apparatus of claim 1, wherein the biological material is at least one of stalks of plants and leaves of plants positioned in a row in the field by a vehicle after the plants have been harvested using a vehicle, wherein the vehicle positions tracking materials in association with the biological material in the row in the field, and wherein the sensing system detects the row of the biological material by detecting the tracking materials.

* * * * *